United States Patent [19]

Weiland

[11] 4,152,890
[45] May 8, 1979

[54] SOLID FUEL INTERNAL COMBUSTION ENGINE

[76] Inventor: Carl W. Weiland, 2980 Interlaken, Orchard Lake, Mich. 48033

[21] Appl. No.: 814,699

[22] Filed: Jul. 11, 1977

Related U.S. Application Data

[63] Continuation of Ser. No. 586,753, Jun. 13, 1975, abandoned.

[51] Int. Cl.$^2$ ............................................. F02C 3/26
[52] U.S. Cl. .............................. 60/39.03; 60/39.46 S; 110/311; 110/347
[58] Field of Search ............ 60/39.46 S, 39.02, 39.03; 110/1 F, 109, 75 C, 311, 313, 347

[56] References Cited

U.S. PATENT DOCUMENTS

| 478,319 | 7/1892 | Edgar | 110/323 |
|---|---|---|---|
| 730,782 | 6/1903 | Morrison | 60/39.46 S |
| 876,227 | 1/1908 | Pelham | 110/1 F |
| 1,173,581 | 2/1916 | Johnson | 126/163 A |
| 1,437,451 | 12/1922 | Sebring | 126/99 R |
| 1,632,401 | 6/1927 | Grahame | 110/109 |
| 1,639,642 | 8/1927 | Law | 110/75 C |
| 1,913,088 | 6/1933 | Ridgely | 110/75 C |
| 2,839,253 | 6/1958 | Yellott | 110/106 |

FOREIGN PATENT DOCUMENTS

| 4972 of | 1880 | United Kingdom | 110/109 |
|---|---|---|---|

*Primary Examiner*—Louis J. Casaregola

*Attorney, Agent, or Firm*—Cushman, Darby & Cushman

[57] ABSTRACT

A solid fuel internal combustion engine is disclosed having a tank for storing particulated solid fuel such as, for example, wood. A combustion chamber is positioned proximate to the storage tank for receiving the solid fuel stored therein, wherein the solid fuel is preheated by the exhaust gases from the combustion chamber but is not ignited until the wood enters the combustion chamber. A portion of the exhaust gases from the combustion chamber is coupled to a compression turbine which in turn drives an air compressor for forcing air or other oxidizing agent under pressure into the combustion chamber. The cold compressed air serves as a combusting agent for igniting and burning the particulated wood. A major portion of the exhaust gases from the combustion chamber is controllably coupled to a power turbine for driving a vehicle or other utilization device. Control means including a throttle at the input to the compressor turbine controls the quantity of air flow into the combustion chamber and hence controls the rate at which the wood is combusted. This in turn controls the pressure of the exhaust gases coupled to the power turbine to thereby control the power output of the power turbine. The output of the power turbine is also controlled by at least one throttle at the input thereof, which throttle controls the pressure level of the exhaust gases coupled to the power turbine to thereby control the power output of the turbine.

14 Claims, 2 Drawing Figures

U.S. Patent      May 8, 1979      4,152,890
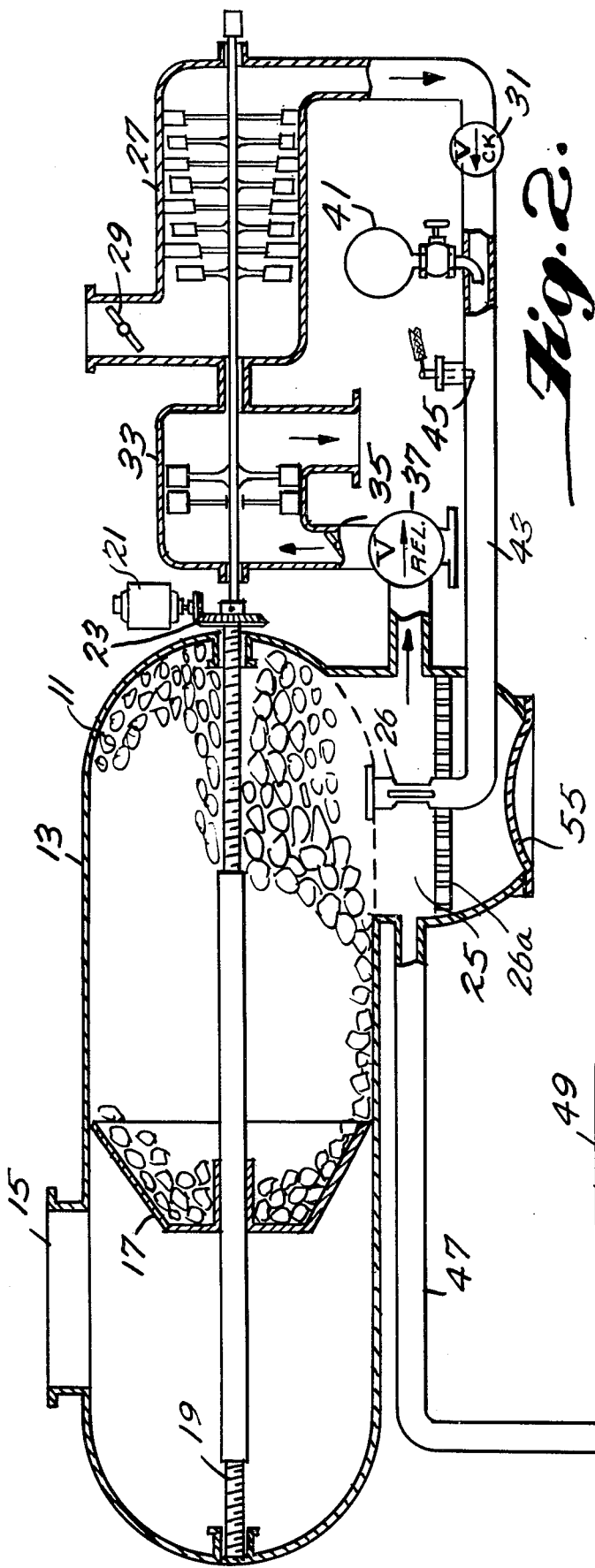
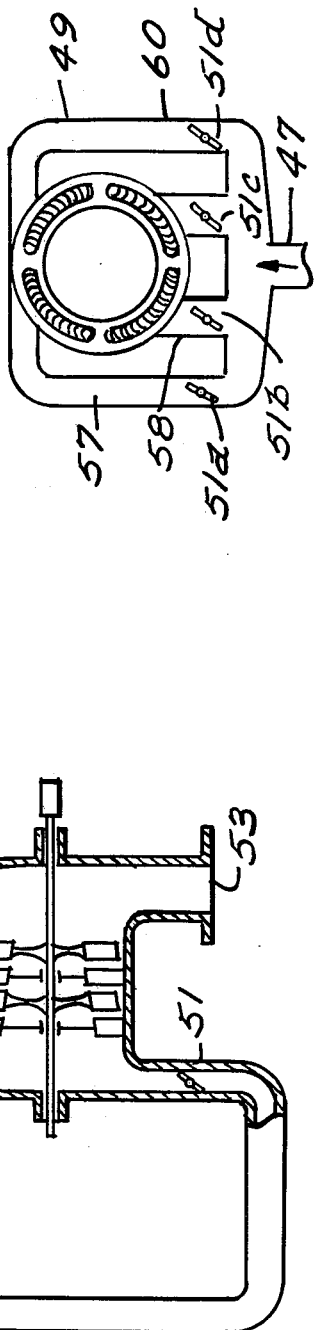

SOLID FUEL INTERNAL COMBUSTION ENGINE

This is a continuation, of application Ser. No. 586,753 filed June 13, 1975 (abandoned).

BACKGROUND OF THE INVENTION

This invention relates to a solid fuel internal combustion engine.

Internal combustion engines presently being utilized require liquid fuels which are primarily derivatives from crude oil or extracted from coal. In addition, synthetic fuels have been developed which are of the liquid type. A major drawback of such internal combustion engines is the fact that the fuel which they use is derived from a limited and exhaustible supply which with time will become so scarce that the expense of operating an internal combustion engine will become prohibitive. In order to overcome this drawback of the present day internal combustion engine, the present invention is directed to a method and apparatus for utilizing a fuel which can be regenerated in a relatively short period of time such as, for example, wood. In addition, the present invention is directed to an internal combustion engine capable of operating or being powered by energy sources such as coal which, although exhaustible, are in plentiful supply.

In the past, internal combustion engines which operate on solid fuel have been developed but have been less than adequate. An example of one such internal combustion engine is disclosed in Fadel U.S. Pat. No. 985,793 wherein particulated solid fuel is fed to a combustion chamber via a slide and chute. The apparatus is quite cumbersome and is subject to jamming and clogging and accordingly, has never been adaptable for use with utilization devices such as automobiles or trucks which require efficient, long-range operating characteristics.

It accordingly is an object of this invention to provide a reliable and efficient internal combustion engine which is powered by particulated solid fuel.

It is another object of this invention to provide an internal combustion engine for vehicles wherein solid fuel is utilized to drive the vehicle.

SHORT STATEMENT OF THE INVENTION

Accordingly, the present invention relates to a solid fuel internal combustion engine which includes a tank for storing particulated solid fuel therein. A combustion chamber is positioned proximate to the storage tank for receiving the solid fuel stored therein, wherein the solid fuel is preheated by the exhaust gases from the combustion chamber. A combusting agent, such as oxygen, is controllably coupled to the combustion chamber under pressure to sustain the oxidation or combustion of the solid fuel therein. The exhaust from the combustion chamber, which is at a high temperature and pressure, is controllably coupled to a power turbine which in turn drives a utilization device such as a vehicle.

The combusting fuel or oxidizing agent is compressed in an air compressor driven by means of a compressor turbine which in turn is driven by a portion of the exhaust gases from the combustion chamber. The compressed combusting agent is coupled to the combustion chamber and after being burnt, a portion thereof is directed upwardly into the fuel tank to preheat the particulated fuel therein. Since the exhaust gases have already been fully deoxidized or combusted, the exhaust gases do not ignite the solid fuel within the storage tank but rather, preheats the particulated solid fuel so that the fuel is readily ignited when it is coupled to the combustion chamber.

Other objects, features and advantages of the present invention will become more fully apparent from the following detailed description of the preferred embodiment, the appended claims and the accompanying drawings in which:

FIG. 1 is a simplified section view taken in elevation of the solid fuel internal combustion engine of the present invention; and FIG. 2 is a simplified section view of the power turbine of the solid fuel internal combustion engine of the present invention.

DETAILED DESCRIPTION OF THE PREFERRED EMBODIMENT

Refer now to FIG. 1 where there is disclosed a simplified section view of the solid fuel internal combustion engine of the present invention. Solid fuel, such as coal or chopped up wood 11, is stored in a storage tank 13. Wood is an ideal fuel source since it can be regenerated by harvesting trees. The use of wood in the present invention can be achieved by cutting the wood in pieces typically in the range of four inches thick. It should be understood, however, that other forms of solid fuel, such as, for example, coal, may be utilized in keeping with the present invention. The solid fuel is positioned within the tank 13 via a refueling port 15 when the pusher member 17 is positioned at the extreme left end of the tank. The pusher member is mounted on a lead screw member 19, which is turned by means of a motor 21 via a gear arrangement of conventional design 23. Thus, as the solid fuel is being burnt, the pusher member 17 gently moves the fuel toward the combustion chamber 25. It should be noted that by counting the number of revolutions of the lead screw, the quantity of fuel remaining in the tank can be determined and accordingly, the lead screw can be utilized as a fuel gauge.

A combusting agent, such as air, is coupled to an air compressor 27 via a throttle 29. The air compressor compresses the air and forces the air past a check valve 31 and into the combustion chamber 25. The air compressor 27 is driven by means of the exhaust gases from the combustion chamber which are coupled to a compressor turbine 33 via throttle 35 and relief valve 37. Thus the compressor turbine 33 drives the air compressor 27 to force cool air under pressure into the combustion chamber 25.

When the engine is initially being started up and the particles of fuel 11 are cooled, an ignition fuel such as gasoline or kerosene, normally stored in tank 41, is passed into the conduit 43 which conducts the compressed air into the compression chamber 25. An ignition means such as a glow terminal or spark plug 45 is provided for igniting the fuel from tank 41 to thereby initiate combustion in the combustion chamber 25. After combustion has been initiated, the exhaust gases, in addition to being coupled to the compressor turbine 33, pass upwardly and into the tank 13 to thereby preheat the solid fuel 11 therein. It should be understood that the exhaust gas does not burn or otherwise oxidize the fuel in tank 13 since the combustion agent in the gas has already been fully combusted or de-oxidized.

A major portion of the exhaust gases from the combustion chamber 25 is coupled via a conduit 47 to a power turbine 49. The hot combustion gases, which are under relatively high pressure, are conducted past at least one throttle member 51 into the power turbine 49 which is of conventional design known in the art. After the exhaust gases have passed through the turbine, they are exhausted through outlet port 53.

The power output of the turbine 49 can be controlled in two ways. First, the throttle 51 provides a direct control by controlling the pressure of the exhaust gases passing into the power turbine 49. In addition, the quantity of exhaust gases flowing into the power turbine can be controlled by means of throttle member 29 and 35 which are preferably coordinated with one another such that when throttle 29 is closed, throttle 35 is closed, thereby inhibiting the rotation of the turbine blades of turbine 33 while at the same time preventing the ingress of the combustion agent into the compressor 27. When, however, throttle 29 is moved to an open, or partially open, position, throttle valve 35 is likewise rotated to an open or partially open position so that compressor turbine 33 can drive the air compressor 27 to provide a compressed combusting agent to the combustion chamber 25.

Check valve 31 is provided to prevent reverse flow of the compressed air while relieve valve 37 is provided to limit the pressure build-up within the combustion chamber 25.

Thus, for refueling purposes, the relieve valve 37 is opened in order to let the pressure in the tank 13 decrease to an ambient level. The cover (not shown) over the refueling port 15 is removed and the pusher member 17 is returned to its extreme left position so that additional solid fuel can be coupled to the tank. At the same time, an ash remover cover 55 is opened to permit removal of ashes from the combustion chamber 25. After cover 55 and the cover to the refueling port 15 have been replaced, the internal combustion engine is again ready for operation.

The combustion chamber 25 and the tank 13 are preferably well insulated so that when the engine is stopped, heat and pressure remain within the tank for a considerable period of time. Thus the fuel is still above the ignition temperature thereof and the engine can accordingly be re-energized immediately by appropriately supplying a combustion agent, such as air, to the combustion chamber 25. It accordingly can be seen that when a utilization device, such as a vehicle, is decelerating or inoperative, the output of the power turbine can be readily controlled, not only by throttle 51 but also by controlling the compressed air inflow to the combustion chamber 25. By so controlling the inflow of pressurized air to the chamber 25, fuel can be conserved when the utilization device does not require a large power input thereto. As shown in FIG. 1, compressed air is supplied to combustion chamber 25 by way of a nozzle 26. Nozzle 26 forms the outlet end of conduit 43 from air compressor 27 and is centrally mounted within combustion chamber 25 so that air flows therein above grate 26a. It will be observed that when air flow through nozzle 26 is at full pressure, air and accordingly the oxygen therein will be supplied throughout the entire chamber 25 and as air pressure decreases nozzle 26 supplies air to a smaller more confined area within chamber 25.

Refer now to FIG. 2 which is an illustration of a preferred embodiment of the power turbine 49 shown in section. The power turbine, which preferably is of the swivel vane type, includes four passages 57–60 for coupling the exhaust gases under pressure to the swivel vanes. Each of the passages includes a throttle 51a–51d which individually control the pressure of the exhaust gases passing through the respective passages 57–60. Thus, if all four throttles are fully open, the power turbine runs at full load and vice versa. It should be understood, however, that any suitable power turbine known in the art may be utilized for receiving the high pressure exhaust gases from the combustion chamber 25 for driving a suitable utilization device.

While the present invention has been disclosed in conjunction with a preferred embodiment thereof, it should be understood that there may be other variations thereof which fall within the spirit and scope of the invention as defined by the appended claims.

What is claimed is:

1. A solid fuel internal combustion engine comprising:
   a tank for storing particulated solid fuel therein,
   a combustion chamber positioned proximate to said tank including grate means for dividing the combustion chamber into a combustion zone for receiving solid fuel and an ash collection zone therebelow, said solid fuel being preheated by the exhaust gases from said combustion chamber,
   means for controllably conducting a combusting agent directly into the solid fuel in said combustion chamber solely by a nozzle located above said grate means and in direct contact with the solid fuel in the combustion zone so that a combustion area is formed within said combustion zone radially around the nozzle, the combustion area having a size extending radially about said nozzle relative to the quantity of inflowing combusting agent, and
   a power turbine for controllably receiving exhaust gases from said combustion chamber, said power turbine driving a utilization device.

2. The solid fuel internal combustion engine of claim 1 wherein said means for controllably conducting said combusting agent to said combustion chamber includes an air compressor, and means receiving a portion of the exhaust gases from said combustion chamber for driving said air compressor.

3. The solid fuel internal combustion engine of claim 2 wherein said means for controllably conducting a combusting agent to said combustion chamber further comprises means for controlling the rate of rotation of said air compressor.

4. The solid fuel internal combustion engine of claim 3 further comprising means associated with said compressor rate controlling means for controlling the input of the combusting agent to said air compressor.

5. The solid fuel internal combustion engine of claim 4 wherein said combusting agent is oxygen.

6. The solid fuel internal combustion engine of claim 5 wherein said solid fuel is particulated wood.

7. The solid fuel internal combustion engine of claim 5 wherein said means for controlling said power turbine includes at least one throttle for limiting the pressure of the exhaust gases entering said power turbine.

8. The solid fuel internal combustion engine of claim 7 further comprising means for igniting said solid fuel in said combustion chamber when said engine is started, said means including a volatile ignition fuel, said fuel being coupled to said compressed air, and means for igniting said fuel as said fuel is coupled to said combustion chamber.

9. The solid fuel internal combustion engine of claim 8 further comprising means for moving said particulated solid fuel toward said combustion chamber as said fuel is burnt therein.

10. A solid fuel internal combustion engine comprising an elongated tank for storing solid fuel, wall means depending from one end of said tank for defining a chamber below and in communication with said tank, a removable cover attached to the bottom of said depending wall means for closing the chamber, a perforated grate positioned within and extending across said depending wall means defining a combustion area above the grate and an ash collection area therebelow; fuel feeding means positioned within said elongated tank for maintaining pressure on the fuel within said elongated tank beginning at a point in said tank at the end opposite the combustion area and for moving the fuel toward the combustion area so that fuel approaching the combustion area is preheated by combustion gases rising therefrom; supply means for controllably supplying a combustion agent solely to the combustion area by a nozzle positioned centrally of and extending vertically above said grate to thereby control the quantity of fuel actually being ignited radially about said nozzle, said supply means including a compressor turbine for compressing the combustion agent, said compressor turbine having an inlet and outlet, a conduit connecting said nozzle to the outlet of said compressor turbine so that as solid fuel is pushed in said tank it will fill the combustion area and surround said nozzle and combustion thereof will extend radially about said nozzle with the size of the fuel actually ignited being controlled by the quantity of combustion agent being supplied through said nozzle, control means for controlling the quantity of combustion agent being compressed and discharged by said compressor turbine; turbine drive means for driving said compressor turbine, a conduit connecting said combustion zone with said turbine drive means so that a portion of the combustion exhaust gases can be conducted from the combustion zone to said turbine drive means and power turbine means for controllably receiving the remaining portion of exhaust gases from said combustion area, said power turbine driving a utilization device.

11. An internal combustion engine as in claim 10 further including relief valve means for relieving pressure within said tank.

12. An internal combustion engine as in claim 10 wherein said utility device comprises an automobile.

13. An internal combustion engine as in claim 10 wherein said fuel feeding means for moving the particulate solid fuel includes a pusher plate, a screw member rotatably mounted within said tank, said pusher plate threadedly engaging said screw member and drive means for rotating said screw member.

14. A method of controlling the combustion of a solid fuel in a solid fuel internal combustion engine in response to the operation of a utilization device such as an automobile driven by a power turbine where the engine has an elongated storage tank and a combustion chamber divided into a combustion zone and an ash pit thereunder by a perforated grate at one end thereof and where a combustion agent is supplied by a compressor turbine driven by a drive turbine, the method comprising the steps of:

maintaining pressure on the solid fuel within the storage tank and continuously pushing the solid fuel toward and into the combustion zone;

supplying a combustion agent into the combustion zone above the level of the grate supporting solid fuel therein solely through a nozzle positioned centrally of and vertically above the grate;

controlling the quantity of fuel actually being ignited radially about the nozzle by controlling the rate at which the combustion agent is supplied to the combustion zone through the nozzle;

withdrawing a first portion of combustion gases produced within the combustion zone and directing that first portion to a drive turbine;

withdrawing the remaining portion of combustion gas produced within the combustion zone and directing that remaining portion to the power turbine;

controlling the quantity of combustion gas withdrawn in the first and remaining portions; and driving a utilization device.

* * * * *